United States Patent
Watabe et al.

(10) Patent No.: US 8,614,936 B2
(45) Date of Patent: Dec. 24, 2013

(54) PICKUP HEAD, INFORMATION RECORDING METHOD AND REPRODUCING METHOD

(75) Inventors: Kazuo Watabe, Yokohama (JP); Hideaki Okano, Yokohama (JP); Takashi Usui, Saitama (JP); Chikara Tanioka, Yokohama (JP); Akihito Ogawa, Fujisawa (JP); Kazuaki Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/410,649

(22) Filed: Mar. 2, 2012

(65) Prior Publication Data

US 2012/0224462 A1 Sep. 6, 2012

(30) Foreign Application Priority Data

Mar. 4, 2011 (JP) .................................. 2011-048181

(51) Int. Cl.
  *G11B 7/09* (2006.01)
(52) U.S. Cl.
  USPC .................................................... 369/30.03
(58) Field of Classification Search
  None
  See application file for complete search history.

(56) References Cited

U.S. PATENT DOCUMENTS

| | | | |
|---|---|---|---|
| 5,982,733 A | 11/1999 | Yanagawa et al. | |
| 6,574,174 B1 | 6/2003 | Amble et al. | |
| 7,800,988 B2 * | 9/2010 | Weirauch | 369/44.27 |
| 2003/0026189 A1 | 2/2003 | Richter et al. | |
| 2008/0219109 A1 * | 9/2008 | Maeda et al. | 369/44.14 |

FOREIGN PATENT DOCUMENTS

| | | |
|---|---|---|
| JP | 61-260434 | 11/1986 |
| JP | 2-312035 | 12/1990 |
| JP | 10-293941 | 11/1998 |
| JP | 10-302403 | 11/1998 |
| JP | 2000-195097 | 7/2000 |
| JP | 2000-285508 | 10/2000 |
| JP | 2002-208173 | 7/2002 |
| JP | 2007-193912 | 8/2007 |
| JP | 2008-097694 | 4/2008 |
| JP | 2008-108383 | 5/2008 |
| JP | 4388176 | 10/2009 |
| JP | 2010-061713 | 3/2010 |

OTHER PUBLICATIONS

Japanese Patent Application No. 2011-048181, First Office Action, mailed Nov. 20, 2012, (with English Translation).

* cited by examiner

*Primary Examiner* — Joseph Feild
*Assistant Examiner* — Parul Gupta
(74) *Attorney, Agent, or Firm* — Blakely, Sokoloff, Taylor & Zafman LLP

(57) ABSTRACT

According to one embodiment, a pickup head includes a plurality of light sources, a first objective lens, second objective lens, a driving unit, a first control unit, a second control unit, light receiving units. The first objective lens focuses a first light beam at a first recording layer. The second objective lens focuses a second light beam at a second recording layer. The driving unit moves the first objective lens and the second objective lens in a first direction and a second direction. The first control unit corrects displacement from target track along the first direction. The second control unit controls a moving direction of a position of the second light spot in the second direction.

8 Claims, 9 Drawing Sheets

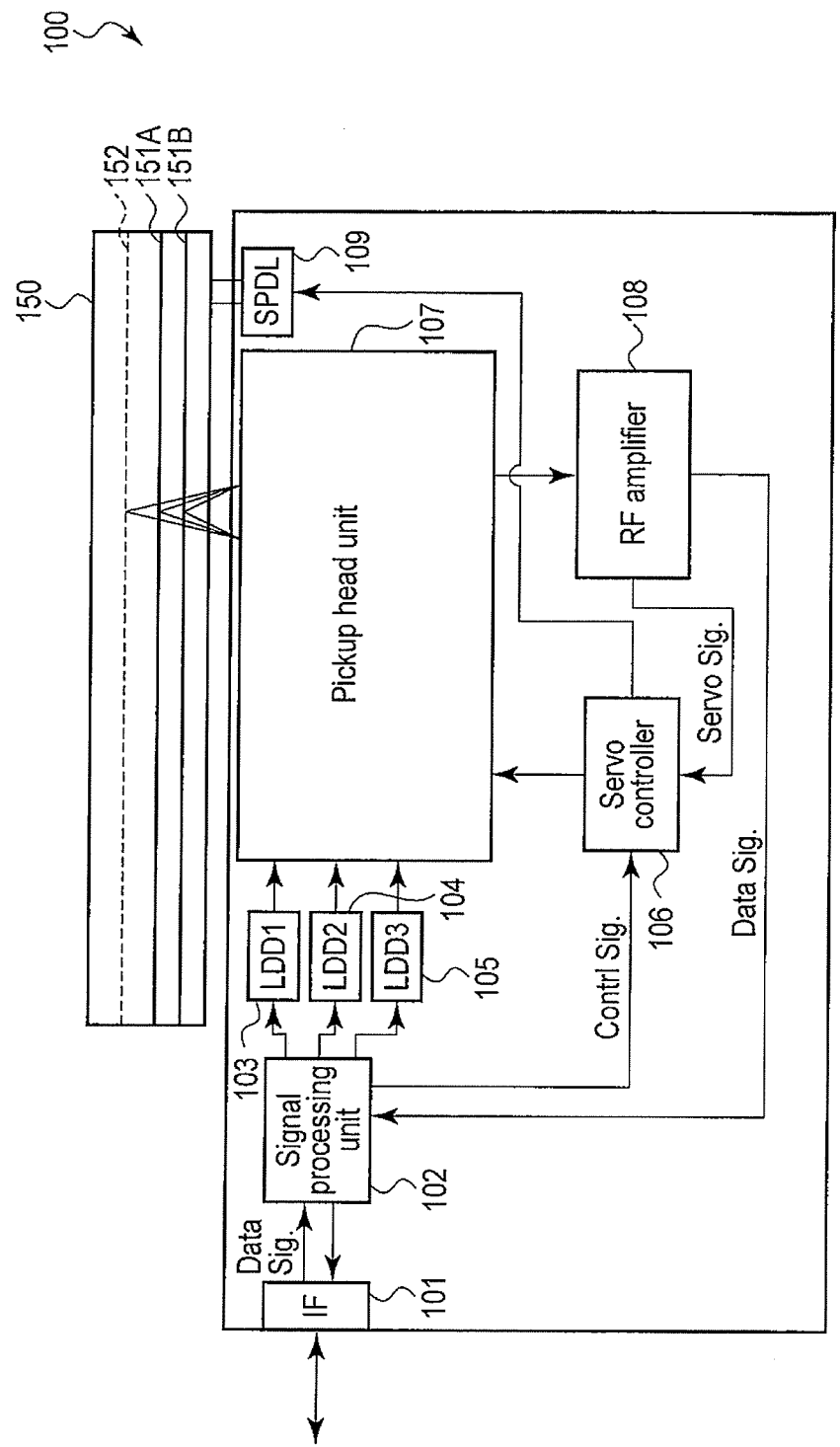
F I G. 1

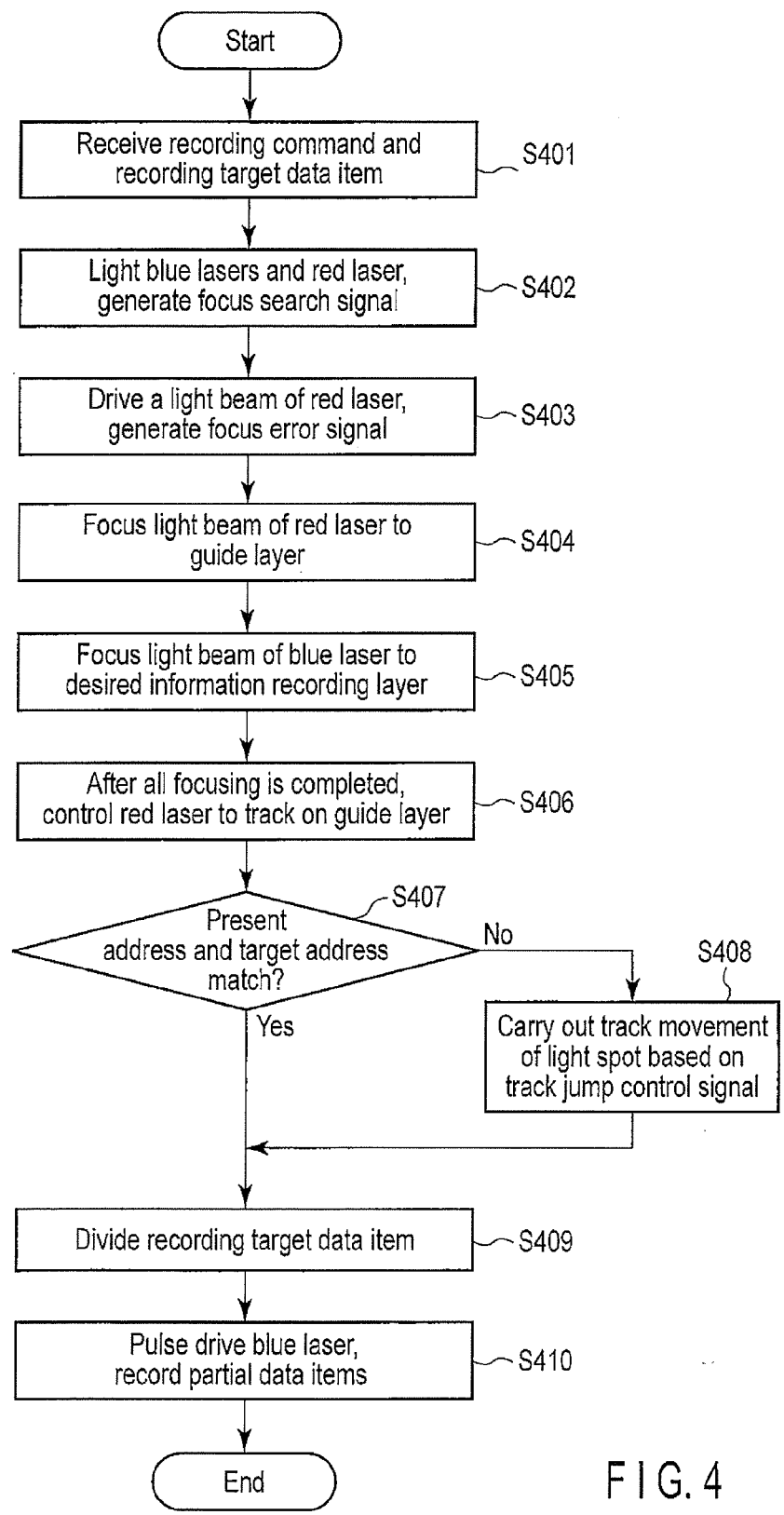
F I G. 4

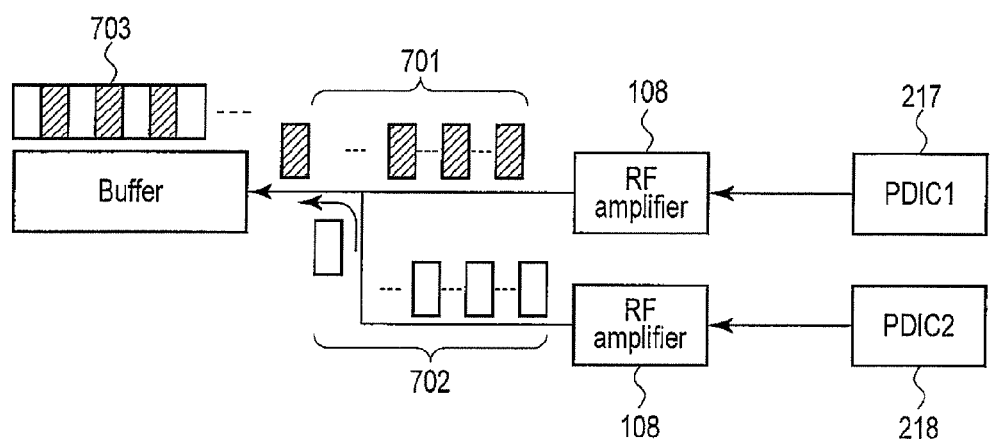
F I G. 7

PICKUP HEAD, INFORMATION RECORDING METHOD AND REPRODUCING METHOD

CROSS-REFERENCE TO RELATED APPLICATIONS

This application is based upon and claims the benefit of priority from prior Japanese Patent Application No. 2011-048181, filed Mar. 4, 2011, the entire contents of which are incorporated herein by reference.

FIELD

Embodiments described herein relate generally to a pickup head, information recording method and reproducing method.

BACKGROUND

A method of increasing the capacity by forming a recording layer of an optical disc into multi-layers is known. However, if the recording/reproducing speed and the transfer rate are the same as in the prior art with respect to the disc with increased capacity, it takes more time to complete the recording by the amount of increased capacity. Thus, a method of irradiating different recording layers from two light sources and recording to increase the recording speed is known.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram illustrating an information recording/reproducing apparatus according to the present embodiment;

FIG. 4 is a flowchart showing an information recording process of the information recording/reproducing apparatus;

FIG. 7 is a view illustrating one example of data combining;

DETAILED DESCRIPTION

Figure 2:
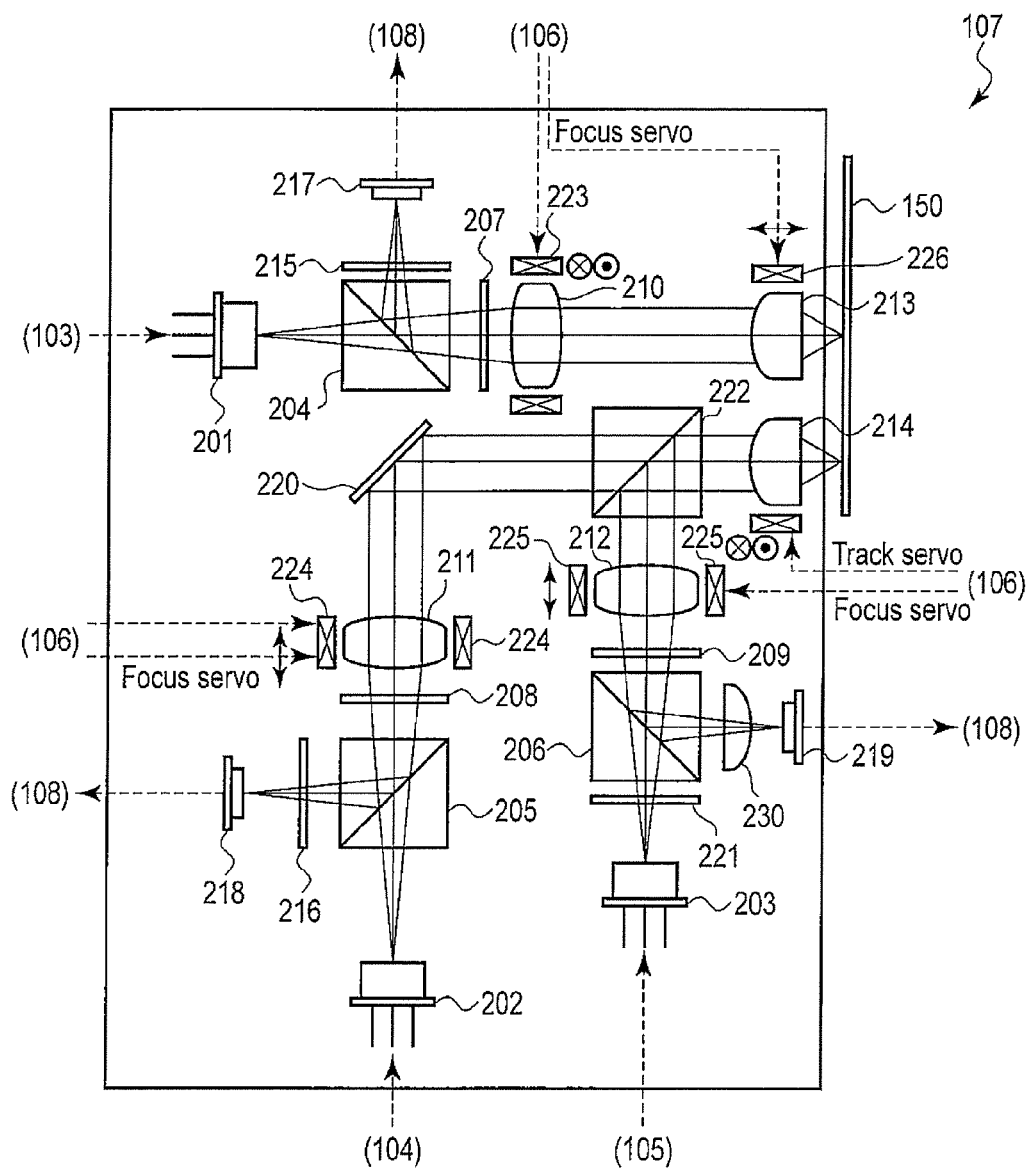
FIG. 2 is a diagram illustrating a pickup head unit according to a first embodiment.

Generally, in a servo control, the displacement in the radial direction of a disk of about a track pitch (about 0.3 micrometer) is not permitted when reproducing the recorded data items, where a possibility that a displacement occurs in an optical system is high taking into consideration a displacement in an attachment position by the degradation of a light source over the years or the temperature, and data reproduction is difficult.

Various embodiments will be described hereinafter with reference to the accompanying drawings.

In general, according to one embodiment, a pickup head includes a plurality of light sources, a first objective lens, second objective lens, a driving unit, a first control unit, a second control unit, one or more light receiving units. The plurality of light sources are configured to irradiate light beams on an information recording medium comprising a plurality of information recording layers, the light sources including first light sources and a second light source, the information recording layers including a first recording layer and a second recording layer, the first recording layer and the second recording layer being in different positions in the information recording medium. The first objective lens is configured to focus a first light beam from the first light source at the first recording layer to form a first light spot. The second objective lens is configured to focus a second light beam from the second light source at the second recording layer to form a second light spot. The driving unit is configured to move the first objective lens in a first direction and a second direction and to move the second objective lens in the first direction and the second direction, the first direction being parallel to the surfaces of the information recording layers and perpendicular to a data recording direction of a track of the information recording layers, the second direction being a stacking direction of the information recording layers. The first control unit is configured to correct displacement from target track along the first direction, the target track being irradiation targets of a first light spot. The second control unit is configured to control a position of the second light spot, the position being moved in the second direction. The one or more light receiving units are configured to receive a first reflected light and a second reflected light, the first reflected light being a light beam that the first light beam is reflected by the first recording layer, the second reflected light being a light beam that the second light beam is reflected by the second information recording layer.

In the following, the pickup head, information recording apparatus reproducing apparatus, and method according to the present embodiments will be described in details with reference to the drawings. In the embodiments described below, elements specified by the same reference number carry out the same operation, and a repetitive description of such elements will be omitted.

(First Embodiment)

An information recording apparatus and an information reproducing apparatus (hereinafter referred to as information recording/reproducing apparatus) according to a first embodiment will be described with reference to a block diagram of FIG. 1.

An information recording/reproducing apparatus 100 according to the first embodiment includes an interface unit (IF: Interface) 101, a signal processing unit 102, laser drivers (LDD: Laser Diode Driver) 103, 104, 105, a servo controller 106, a pickup head unit 107, an RF amplifier 108, and a spindle motor (SPDL) 109. An information recording medium (hereinafter referred to as optical disc) 150 is set in the spindle motor 109.

The interface unit 101 is a connecting portion adapted to exchange commands and data items with an external host (not shown), and corresponds to a specific standard such as the SATA (Serial Advanced Technology Attachment).

The signal processing unit 102 receives the command and data item from the external host via the interface unit 101, and converts the data item. The signal processing unit 102 then sends a data pulse and a control signal to each laser driver 103, 104, 105, and sends the control signal to the servo controller 106. The signal processing unit 102 also receives a data signal from the RF amplifier 108, and sends the command and the data signal to the external host via the interface unit 101.

The laser drivers 103, 104, 105 receive the data pulse and the control signal from the signal processing unit 102, and converts the data pulse to a drive pulse.

The servo controller 106 receives a servo signal from the RF amplifier 108, and converts the servo signal to an actuator drive signal and a spindle motor drive signal.

The pickup head unit 107 receives the drive pulse from each laser driver 103, 104, 105 and the actuator drive signal from the servo controller 106, irradiates the optical disc 150 with the laser light beam, and forms a light spot where the light beams is focused. A reflected light of the irradiated laser light beam is also received to generate an electric signal corresponding to the intensity of the reflected light.

The RF amplifier 108 receives the electric signal from the pickup head unit 107, amplifies the electric signal, and generates the servo signal or the data signal.

The spindle motor 109 receives the spindle motor drive signal from the servo controller 106, and rotates the set optical disc 150 about an axis perpendicular to a plane of the optical disc 150.

The details of the pickup head unit 107 will now be described with reference to FIG. 2.

The pickup head unit 107 includes blue lasers (blue laser diodes) 201, 202, a red laser 203, polarizing beam splitters (PBS) 204, 205, 206, quarter wavelength plates (QWP) 207, 208, 209, collimator lenses (CL) 210, 211, 212, objective lenses (OL) 213, 214, holographic optical elements (HOE) 215, 216, blue photo detector integrated circuits (Blue PDIC) 217, 218, a red photo detector integrated circuit (Red PDIC) 219, a mirror (MR) 220, a grating (GT) 221, a dichroic prism (DP) 222, collimator lens actuators 223, 224, 225, an objective lens actuator 226, and a cylindrical lens 230. The collimator lens 210 and the collimator lens actuator 223 may be combined and referred to as a first control unit, and the collimator lens 211 and the collimator lens actuator 224 may be combined and referred to as a second control unit.

The blue lasers 201, 202 are semiconductor lasers having a wavelength of 405 nm, for example, and irradiate information recording layers 151A, 151B of the optical disc 150 with the light beam for recording and reproduction. Specifically, the blue laser 201 is connected to the laser driver 103 shown in FIG. 1, and the blue laser 202 is connected to the laser driver 104.

The read laser 203 is a semiconductor laser having a wavelength of 655 nm, for example, and irradiates a guide layer 152 of the optical disc 150 with the light beam for tracking servo. The red laser 203 is connected to the laser driver 105 of the information recording/reproducing apparatus 100.

The polarizing beam splitters 204, 205, 206 transmit an incident light from the blue laser 201, 202 and the red layer 203 respectively, and reflect a reflected light reflected by the optical disc 150 in which a polarizing surface is rotated 90 degrees from the incident light. Specifically, the PBS 204 transmits and reflects the light beam from the blue laser 201, the PBS 205 transmits and reflects the light beam from the blue laser 202, and the PBS 206 transmits and reflects the light beam from the red laser 203.

The quarter wavelength plates 207, 208, 209 transmit the incident light from the blue laser 201, 202, or the red laser 203, and converts a linear polarized light to a circular polarized light. The quarter wavelength plates 207, 208, 209 also transmit the reflected light from the optical disc 150 of the blue laser 201, 202, and the red laser 203, and converts a circular polarized light to a linear polarized light. The linear polarized light in this case is a linear polarized light in which the polarizing direction differs from the incident light by 90 degrees. For instance, if the incident light is a P-polarized light, the reflected light is a S-polarized light. Specifically, the quarter wavelength plate 207 converts the light beam from the blue laser 201, the quarter wavelength plate 208 converts the light beam from the blue laser 202, and the quarter wavelength plate 209 converts the light beam from the red laser 203.

The collimator lenses 210, 211, 212 convert the incident light from the blue laser 201, 202, and the red laser 203 to a substantially collimated light. Specifically, the collimator lens 210 converts the light beam from the blue laser 201, the collimator lens 211 converts the light beam from the blue laser 202, and the collimator lens 212 converts the light beam from the red laser 203 respectively to a collimated light.

The objective lenses 213, 214 focus the light beam irradiated from the blue lasers 201, 202 on the information recording layer of the optical disc 150. The objective lens 213 and the objective lens 214 focus the light beam that passed the respective objective lens onto a different information recording layer (e.g., 151A and 151B of FIG. 1). The objective lens 213 focuses the light beam from the red laser 203 on the guide layer of the optical disc 150.

The holographic optical elements 215, 216 each transmits the reflected light in which the light beam from the blue laser 201 and the blue laser 202 is reflected by the information recording layer of the optical disc 150, and diffracts a predetermined region of the light beam at a predetermined angle.

The cylindrical lens 230 transmits the reflected light in which the light beam from the red laser 203 is reflected by the guide layer of the optical disc 150, and provides astigmatism to the light beam.

The blue photo detector ICs 217, 218 receive the light beam of the blue laser transmitted through the holographic optical element, generate a current corresponding to the received light quantity, convert the current to a voltage with an interior current-voltage conversion circuit, and output the same. Specifically, the blue photo detector IC 217 receives the light beam of the blue laser 201 reflected by the polarizing beam splitter 204 and transmitted through the holographic optical element 215. The blue photo detector IC 218 receives the light beam of the blue laser 202 reflected by the polarizing beam splitter 205 and transmitted through the holographic optical element 216.

The red photo detector IC 219 receives the light beam of the red laser reflected by the polarizing beam splitter 206, generates a current corresponding to the received light quantity, converts the current to a voltage with an interior current-voltage conversion circuit, and outputs the same.

The mirror 220 reflects the light beam from the blue laser 202 transmitted through the collimator lens 211 towards the dichroic prism 222, to be described later.

The grating 221 is a diffracting grating that divides the light beam from the red laser 203 to three beams of 0th order, +1st order, and −1st order by diffraction. The three beams become one main beam (0th order), and two sub-beams (+1st order, −1st order) on the optical disc 150.

The dichroic prism 222 transmits the incident light from the blue laser 202, and reflects the incident light from the red laser 203.

The collimator lens actuator 223 drives the collimator lens 210 so that the light beam of the blue laser 201 that passed the objective lens 213 moves in an in-plane perpendicular direction with respect to a tangential direction of the information recording track in the information recording layer of the optical disc 150. In the present embodiment, the collimator lens 210 is driven so that the light spot moves in a radial direction from a rotation center axis of the optical disc 150.

The collimator lens actuator 224 drives the collimator lens 211 so that the light beam of the blue laser 202 that passed the objective lens 214 moves in a focus direction indicating the thickness direction of the optical disc 150. Specifically, the collimator lens 211 is driven to move closer to or move away from the opposing surface of the quarter wavelength plate 208.

The collimator lens actuator 225 drives the collimator lens 212 so that the light beam of the red laser 203 that passed the objective lens 214 moves in the focus direction. Specifically, the collimator lens 212 is driven to move closer to or move away from the opposing surface of the quarter wavelength plate 209, similar to the collimator lens actuator 224.

The objective lens actuator 226 integrally drives the objective lens 213 and the objective lens 214, and drives the objective lens 213 and the objective lens 214 in the focus direction so that the light beam that passed the objective lens 213 and the objective lens 214 each moves in the focus direction in the optical disc 150. The objective lens 213 and the objective lens 214 are also driven so that the light beam that passed the objective lens 213 and the objective lens 214 move in the radial direction in the optical disc 150.

Figure 3:
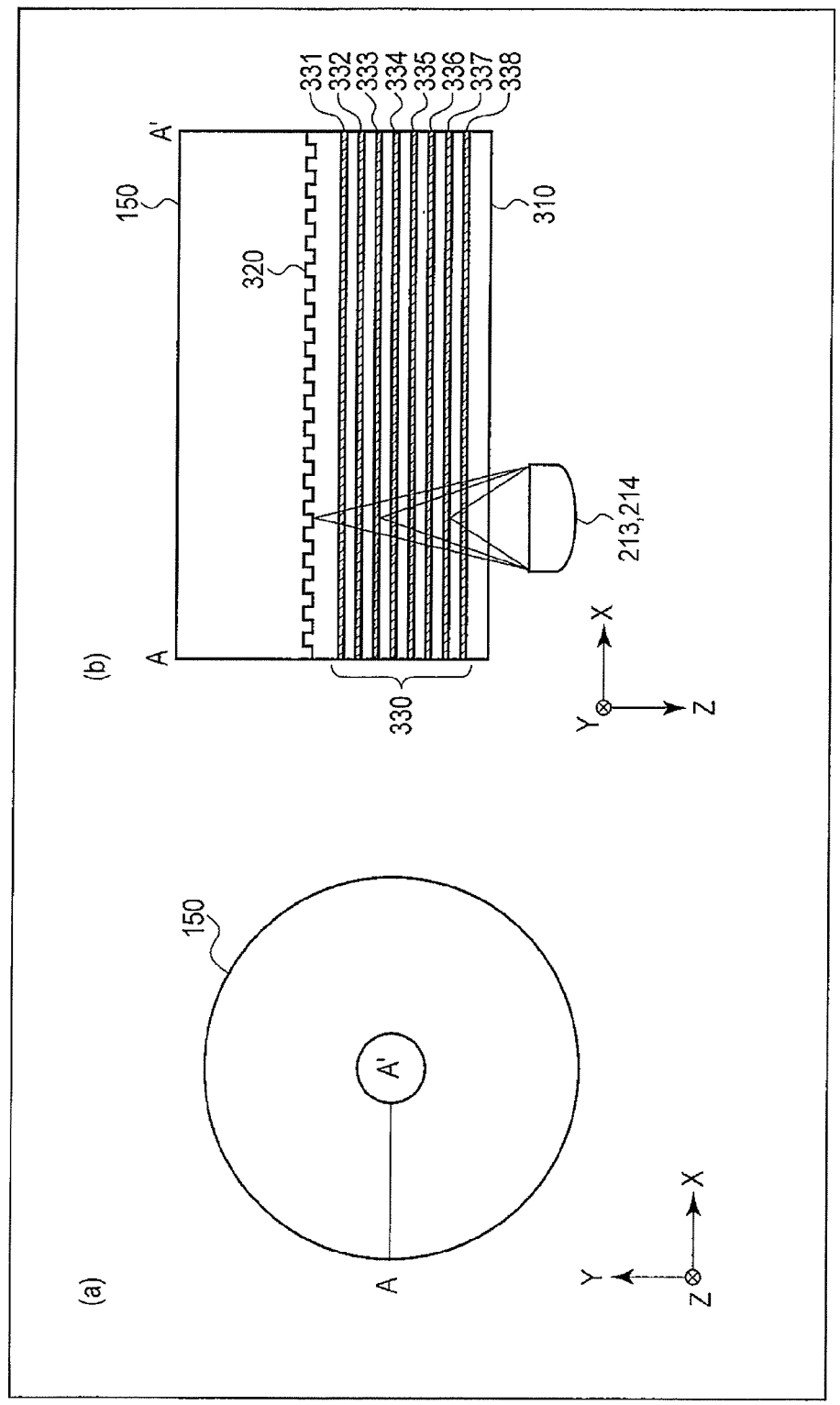
FIG. 3 is (a) a top view of an optical disc and (b) a cross-sectional view of the optical disc.

One example of the upper surface shape and the cross-sectional structure of the optical disc 150 will be described with reference to FIG. 3.

FIG. 3(a) shows a diagram seen from the upper surface of the optical disc 150, and FIG. 3(b) shows a cross-sectional view of when cut along a line A-A' of FIG. 3(a).

As shown in FIG. 3(a), the optical disc 150 is a circular disc having a diameter of 120 mm and a thickness of 1.2 mm, for example. The diameter and the thickness of the disc are not limited thereto, and may be increased or decreased to a diameter of 80 mm, 150 mm, etc., and the thickness may also be thin or 0.1 mm, 0.2 mm etc. or thick 1.3 mm, 1.4 mm, 1.5 mm, etc. Furthermore, the shape of the optical disc 150 is not limited to a disc-shape, and may be a rectangle, a square, or other polygonal card shape.

The optical disc 150 has a layered structure in the thickness direction. A guide layer 320 is provided in a layer farthest from a disc surface 310 to be irradiated with the light beam for recording and reproduction, and a data layer 330 is provided from the guide layer 320 towards the disc surface 310. A structure in which the guide layer 320 is provided in a layer closest to the disc surface 310, and the data layer 330 is provided towards the farther layer may be adopted.

The guide layer 320 is used to carry out an in-plane tracking of the blue laser in the information recording layer, where the light beam from the red laser 203 is passed through the objective lens 214 and focused.

The data layer 330 is divided to eight information recording layers, or information recording layers 331, 332, 333, 334, 335, 336, 337 and 338 from the layer farthest from the disc surface 310. In the present embodiment, the total number of information recording layers is eight, but this is not the sole case, and the number of information recording layers merely need to be two or more.

The guide layer 320 has a guiding groove formed to a spiral-form from the inner periphery to the outer periphery, or from the outer periphery to the inner periphery of the disc. The groove may be formed to a concentric circular form instead of a spiral-form. The groove is performed with meandering called a wobble, where the address information on the disc is embedded in advance with frequency, phase, amplitude, and the like of the wobble. The groove is not formed in each layer of the information recording layer. In the data layer 330, the light beams from the blue laser 201 and the blue laser 202 are passed through the objective lenses 213 and 214 respectively, and irradiated on the different information recording layers. In the example of FIG. 3, the light beam is irradiated on the information recording layers 333 and 337, and light spots are formed on the information recording layers, so that the data can be recorded. In FIG. 3, the objective lenses 213 and 214 are illustrated in the manner that they are overlapped each other.

In the present embodiment, a case of recording the data item on the optical disc including the guide layer for servo is assumed, but is not limited thereto, and application can be made to a general optical disc that includes the groove in the information recording layer itself without including the guide layer.

The information recording process of the information recording/reproducing apparatus according to the first embodiment will now be described with reference to the flowchart of FIG. 4.

In step S401, a recording command of user data and a recording target data item are generated in an external host, and the signal processing unit 102 receives the recording command and the recording target data item via the interface unit 101.

In step S402, the data recording process is started according to the recording command received by the signal processing unit 102. First, the signal processing unit 102 sends a drive signal to the laser driver 103, the laser driver 104, and the laser driver 105 to turn on the blue lasers 201, 202 and the red laser 203 at the light intensity necessary for the servo control. The signal processing unit 102 then sends a focus search control signal to the servo controller 106.

In step S403, the servo controller 106 drives the collimator lens actuator 225 in the focus direction with simple-harmonic-wave motion or triangular-wave motion according to the focus search control signal. The light spot by the light beam of the red laser 203 that passed the objective lens 214 repeatedly reciprocates up and down with the guide layer 320 of the optical disc 150 shown in FIG. 3 in between. The reflected light of the guide laser 320 of the red laser 203 is collected by the red photo detector IC 219. The red photo detector IC 219 converts the current based on the reflected light quantity to voltage, and feeds the same to the RF amplifier 108. The RF amplifier 108 generates a focus error signal by a known astigmatism method of the light beam of the red laser through a predetermined calculation from the received voltage signal, and sends the same to the servo controller 106.

In step S404, the servo controller 106 switches the drive of the collimator lens actuator 225 from the simple-harmonic-wave motion to the drive based on the focus error signal around where the focus error signal becomes zero to focus the light beam of the red laser 203 to the guide layer.

In step S405, the servo controller 106 focus the light beam from the blue laser 201 and the blue laser 202 each to the desired information recording layer in the optical disc 150. Specifically, the light beam of the blue laser 201 is focused to the desired information recording layer when the objective lens actuator 226 is driven in the focus direction based on the voltage signal provided from the blue photo detector IC 217 and the focus error signal by a known Foucault method, for example, generated in the RF amplifier 108. As a result, the light spot of the blue laser 201 is formed on the desired information recording layer. The light beam of the blue laser 202 is focused to the target information recording layer when the collimator lens actuator 224 is driven based on the voltage signal received from the blue photo detector IC 218 and the focus error signal by a known Foucault method, for example, generated in the RF amplifier 108, so that the light spot is formed on the information recording layer.

In step S406, the servo controller 106 let the red laser 203 to trace the track on the guide layer after the focusing of t all the light beams is completed. Specifically, the servo controller 106 drives the objective lens actuator to trace the track on the guide layer based on the tracking error signal by the known differential push pull method generated in the RF amplifier 108 by the voltage signal received from the red photo detector IC 219.

In step S407, the signal processing unit 102 reads the data signal generated by the RF amplifier 108 based on the voltage signal received from the red photo detector IC 219, reproduces the present address, and determines whether or not the present address matches the target address. The process proceeds to step S409 if the present address matches the target address. If the present address is different from the target address, that is, if there is a displacement, the signal processing unit 102 generates a track jump control signal for controlling the movement by a track corresponding to the difference of the present address and the target address, and proceeds to step S408.

In step S408, the servo controller 106 receives the track jump control signal, sends a drive pulse to the objective lens actuator 226 based on the track jump control signal, and moves the light spot by the light beam of the red laser 203 to the target track, which is to become the desired irradiation target. In this case, the objective lens 213 and the objective lens 214 are integrally driven so that the light spot of the light beam of the blue laser 201 and the light beam of the blue laser 202 is also similarly carried out with track movement. The information recording layer may not necessarily include a track, and thus the track movement referred herein means the movement in the direction of changing the track.

In step S409, the signal processing unit 102 carries out a dividing process of the recording target data item received from an external host, and sends the divided recording data series to the laser driver 103 and the laser driver 104, respectively. The divided recording data series are also referred to as partial data items. The data dividing process will be described later with reference to FIG. 5.

In step S410, the laser driver 103 generates a drive pulse corresponding to the received recording data series, and pulse drives the blue laser 201 according to the received drive pulse. The pulse emitted at a light intensity recordable to the optical disc from the blue laser 201 is passed through the objective lens 213, and irradiated on the information recording layer of the optical disc 150 to form a recording mark corresponding to the recording data series. Similarly, the laser driver 104 generates a drive pulse corresponding to the received recording data series, and pulse drives the blue laser 202 according to the received drive pulse. The pulse emitted by the blue laser 202 is passed through the objective lens 214, and irradiated on a different information recording layer of the optical disc 150 to form a recording mark corresponding to the recording data series. The operation in the information recording of the information recording/reproducing apparatus 100 according to the present embodiment is then terminated.

As described above, a series of recording target data item can be divided so that recording can be carried out simultaneously on two information recording layers, whereby high speed recording can be realized even if the data size is large.

One example of the data dividing process in the signal processing unit 102 at the time of information recording will now be described with reference to FIG. 5.

The signal processing unit 102 carries out the dividing process of the recording target data item sent from the external host. The recording target data item 501 is normally a binary data series including "0" and "1", and is the data item of after the necessary modulation and error correction coding process are carried out on the user data item in the present embodiment. In other words, it is the data item in which the binary data series is to be recorded in the information recording layer of the optical disc 150.

Figure 5:
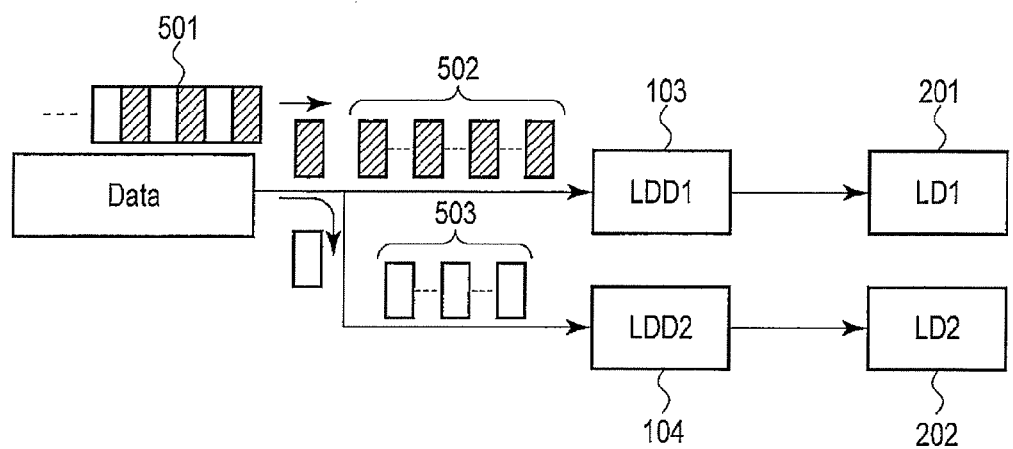
FIG. 5 is a view illustrating one example of data division.

As shown in FIG. 5, a series of recording target data item 501 is divided to partial data items 502 and partial data items 503 to record to different layers of the optical disc 150 with two light beams. The division from the recording target data item 501 to the partial data items 502 and 503 is such that division is normally carried out in a constant binary data series unit such as 2 kByte units, and then alternately distributed to each partial data items. The dividing unit of the recording target data item 501 does not need to be in units of 2 kByte, and may be in units of 1 bit or in units of 1 MByte. Furthermore, it may not necessarily be in units of a constant length, and may be alternately divided to units of different lengths. Alternatively, a header such as a synchronization mark may be added to the data item divided in units of 2 kByte.

The partial data items 502 and the partial data items 503 are input to the laser driver 103 and the laser driver 104, respectively, and irradiated from the blue laser 201 and the blue laser 202 as a light beam.

The information reproducing process of the information recording/reproducing apparatus 100 according to the first embodiment will now be described with reference to FIG. 6.

In step S601, the signal processing unit 102 receives a reproduction command of the user data item from the external host via the interface unit 101.

In step S602, the signal processing unit 102 starts a data reproducing process according to the received reproduction command. First, the signal processing unit 102 sends a drive signal to the laser driver 103, the laser driver 104, and the laser driver 105 to light the blue lasers 201, 202 and the red laser 203 at the power to carry out the reproduction of the information. The signal processing unit 102 then sends a focus search control signal to the servo controller 106.

In step S603, the servo controller 106 drives the collimator lens actuator 225 in the focus direction with simple-harmonic-wave motion or triangular-wave motion according to the focus search control signal. The light spot by the light beam of the red laser 203 that passed the objective lens 214 repeatedly reciprocates up and down with the guide layer 320 of the optical disc 150 shown in FIG. 3 in between. The reflected light of the guide laser 320 of the red laser 203 is collected by the red photo detector IC 219. The red photo detector IC 219 converts the current based on the reflected light quantity to voltage, and feeds the same to the RF amplifier 108. The RF amplifier 108 generates a focus error signal by a known astigmatism method of the light beam of the red laser through a predetermined calculation from the received voltage signal, and sends the same to the servo controller 106.

In step S604, the servo controller 106 switches the drive of the collimator lens actuator 225 from the simple-harmonic-wave drive to the drive based on the focus error signal around where the focus error signal becomes zero to focus the light beam of the red laser 203 to the guide layer.

In step S605, the servo controller 106 focuses the light beam from the blue laser 201 and the blue laser 202 each to the desired information recording layer in the optical disc 150. In this case, the focus of the light beam of the blue laser 201 is focused to the desired information recording layer when the objective lens actuator 226 is driven in the focus direction based on the voltage signal provided from the blue photo detector IC 217 and the focus error signal generated in the RF amplifier 108. The focus of the light beam of the blue laser 202 is focused to the target information recording layer when the collimator lens actuator 224 is driven based on the voltage signal received from the blue photo detector IC 218 and the focus error signal generated in the RF amplifier 108.

In step S606, the servo controller 106 lets the red laser 203 to trace the track on the guide layer after the focusing of all the light beams is completed. In this case, the servo controller 106 drives the objective lens actuator to trace the track on the guide layer based on the tracking error signal generated in the RF amplifier 108 by the voltage signal received from the red photo detector IC 219.

In step S607, the signal processing unit 102 reads the data signal generated by the RF amplifier 108 based on the voltage signal received from the red photo detector IC 219, reproduces the present address, and determines whether or not the present address matches the target address. The process proceeds to step S609 if the present address matches the target address. If the present address is different from the target address, that is, if there is a displacement, the signal processing unit 102 generates a track jump control signal, and proceeds to step S608.

In step S608, the servo controller 106 receives the track jump control signal, sends a drive pulse to the objective lens actuator 226 based on the track jump control signal, and moves the light spot by the light beam of the red laser 203 to the desired track. In this case, the objective lens 213 and the objective lens 214 are integrally driven so that the light spot of the light beam of the blue laser 201 and the light beam of the blue laser 202 is also similarly carried out with track movement.

In step S609, the blue photo detector IC 217 converts the current based on the reflected light quantity of the reflected light in which the light beam from the blue laser 201 is reflected by the information recording layer of the optical disc 150 to voltage, and sends the same to the RF amplifier 108. The RF amplifier 108 generates a tracking error signal of the light beam from the blue laser 201 through a predetermined calculation from the received voltage signal, and provides the same to the servo controller 106. The tracking error signal in this case is, for example, a differential phase detection (DPD) signal or a push pull signal generated from a recorded mark row of the information recording layer. Similarly, the blue photo detector IC 218 also generates a tracking error signal based on the reflected light quantity of the reflected light in which the light beam from the blue laser 202 is reflected by the information recording layer of the optical disc 150. The tracking error signal in this case is, for example, a DPD signal or a push pull signal generated from a recorded mark row of the information recording layer.

In step S610, the signal processing unit 102 sends a control signal to the servo controller 106 after determining that the light spot reach the target address in order to separate the servo control from the guide layer basis to the information recording layer basis.

In step S611, the servo controller 106 switches the drive of the lens actuator 226 from the drive based on the tracking error signal of the light beam of the red laser 203 to the drive based on the tracking error signal of the light beam of the blue laser 202, and lets the blue laser 202 to trace the recorded track of the information recording layer. The servo controller 106 drives the collimator lens actuator 223 based on the tracking error signal of the light beam of the blue laser 201, and lets the light beam of the blue laser 201 to trace the recorded track of the information recording layer.

In step S612, the signal processing unit 102 reads the data signal generated by the RF amplifier 108 based on the voltage signal provided from the blue photo detector IC 217. The present address of the information recording layer which the blue laser 201 focuses is reproduced, and whether or not the present address and the target address match is determined. If the present address and the target address match, the process proceeds to step S614. If the present address and the target address do not match, the signal processing unit 102 generates a track jump control signal for the track corresponding to the difference between the present address and the target address, and proceeds to step S613.

In step S613, the servo controller 106 receives the track jump control signal, sends a drive pulse to the collimator lens actuator 223 based on the track jump control signal, and moves the light spot of the light beam by the blue laser 201 to the desired target track.

In step S614, the signal processing unit 102 determines whether or not the process is carried out for all the blue lasers. The process proceeds to step S615 if the process is carried out for all the blue lasers, and the process returns to step S612 if the process is not performed for all the blue lasers, and similar process is repeated.

In the example of the present embodiment, the process of the blue laser 201 is terminated but the process is not yet performed for the blue laser 202, and hence the signal processing unit 102 reads the data signal generated by the RF amplifier 108 based on the voltage signal received from the blue photo detector IC 218. The present address of the information recording layer which the blue laser 202 focuses is reproduced, and whether or not the present address and the target address match is determined. If the present address and the target address match, the process proceeds to step S615. If the present address and the target address do not match, the signal processing unit 102 generates a track jump control signal, and proceeds to step S613.

In step S613, the servo controller 106 receives the track jump control signal, sends a drive pulse to the objective lens actuator 226 based on the track jump control signal, and moves the light spot of the light beam by the blue laser 202 to the desired target track. The blue laser 201 carries out the track hold operation so as to remain at the target address during the tracking operation (S612, S613) to the target address of the blue laser 202. The track hold operation of the blue laser 201 refers to the operation in which the servo controller 106 repeats the track jump operation every time the optical disc 150 makes one rotation to continue letting the light beam of the blue laser 201 to trace the same track of the information recording layer while driving the collimator lens actuator 223 based on the tracking error signal of the light beam of the blue laser 201.

In step S615, the signal processing unit 102 checks that the light beams of the two blue lasers reached the target address, and starts the data reproduction from the two different information recording layers, respectively. In this case, the signal processing unit 102 carries out a combining process of the data items reproduced from two different information recording layers. As the reproducing target data item corresponding to the recording target data item is stored in the buffer (not shown) in the same alignment order as the time of recording, the signal processing unit 102 can retrieve the reproducing target data item sequentially from the buffer to the external host. The combining process of the data items will be described later with reference to FIG. 7. The information reproducing process of the information recording/reproducing apparatus 100 according to the present embodiment is then terminated.

One example of a data combining process by the signal processing unit 102 in information reproduction will now be described with reference to FIG. 7.

As shown in FIG. 7, the reflected light of the light beam from the blue laser 201 received by the blue photo detector IC 217 is reproduced as reproducing partial data items 701 from the information recording layer through the RF amplifier 108. The reproducing partial data items 701 are provided to the buffer (not shown) of the signal processing unit 102. The reflected light of the light beam from the blue laser 202 received by the blue photo detector IC 218 is provided to the buffer of the signal processing unit 102 as reproducing partial data items 702 through the RF amplifier 108.

In the signal processing unit 102, the reproducing partial data items 701 and reproducing partial data items 702 are alternately combined in units of a constant length defined at the time of recording, for example, units of 2 kByte, and stored in a buffer as reproducing data item 703.

In the present embodiment, the objective lens 213 and the objective lens 214 are desirably integrally driven from the standpoint of easy manufacturing and cost, and thus a case in which the objective lens 213 and the objective lens 214 are integrally driven in the focus direction and the radial direction is considered. However, this is not the sole case, and the objective lens 213 and the objective lens 214 may be separately driven in the focus direction and the radial direction.

In the present embodiment, a case of using two blue laser light sources and two objective lenses is assumed, but this is not the sole case, and processes similar to the processes described above can be carried out even if three or more light sources and the objective lens of a number corresponding to the number of light sources are used. As the dividing number of data item that can be parallel processed increases with increase in the number of light sources, the data item can be recorded and reproduced at higher speed.

Figure 6:
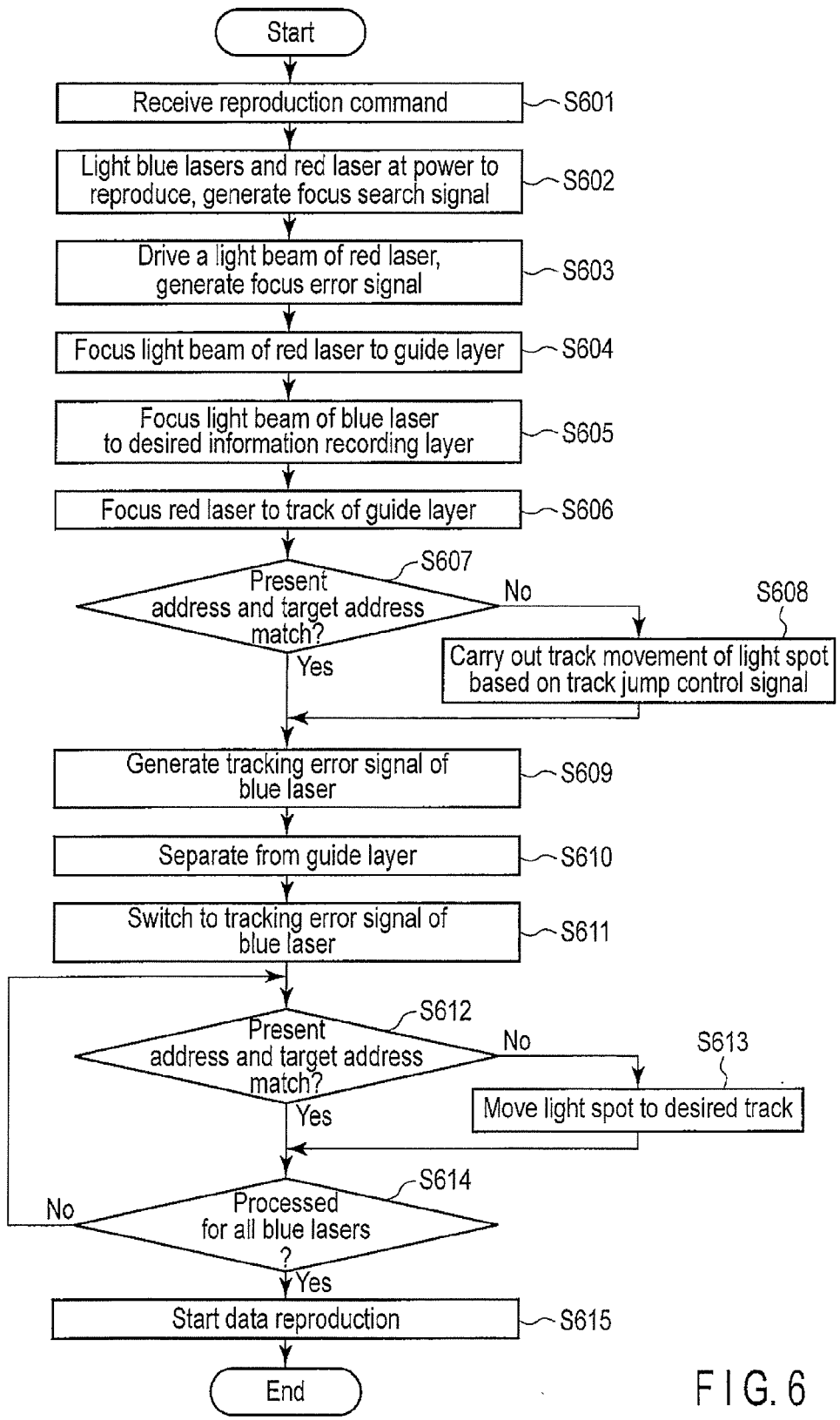
FIG. 6 is a flowchart showing an information reproducing process of the information recording/reproducing apparatus.

Furthermore, the processes from step S611 to step S614 shown in FIG. 6 may be carried out when recording information.

According to the information recording/reproducing apparatus of the first embodiment, the data item can be divided to two information recording layers of a multi-layer recording medium and simultaneously recorded, so that high speed information recording can be realized. Furthermore, the displacement of the light beam with respect to the radial direction can be corrected by controlling the collimator lens in the radial direction based on the error signal, so that the information can be reproduced simultaneously from the two information recording layers while correcting the position relationship of the two light beams and combining the same to a series of reproducing target data item for reproduction even if there is a displacement in the light spot so that high speed information reproduction can be realized.

(Second Embodiment)

Two objective lenses are used in the first embodiment, but a pickup head unit of an information recording/reproducing apparatus according to a second embodiment differs in that the light beam is irradiated on different information recording layers from one objective lens.

The pickup head unit of the information recording/reproducing apparatus according to the second embodiment will be described with reference to FIG. 8.

A pickup head unit 800 according to a second embodiment includes blue lasers 201, 202, a red laser 203, polarizing beam splitters 204, 206, a half wavelength plate (HWP) 801, a quarter wavelength plate 209, collimator lenses 210, 211, 212, an objective lens 213, holographic optical elements 215, 216, blue photo detectors IC 217, 218, a red photo detector IC 219, a dichroic prism 222, collimator lens actuators 223, 224, 225, an objective lens actuator 226, and a cylindrical lens 230.

Configuring elements carrying out operations different from the configuring elements of the pickup head unit 107 according to the first embodiment of the configuring elements of the pickup head unit 800 according to the second embodiment will be described below.

The half wavelength plate 801 transmits the incident light from the blue laser 201 and rotates the polarizing surface. The half wavelength plate 801 is combined with the polarizing beam splitter 204 to adjust the light quantity to irradiate on the optical disc 150.

The polarizing beam splitter 204 transmits the light beam from the blue laser 201, and reflects the light beam from the blue laser 202.

The dichroic prism 222 transmits the incident light from the blue laser 201 and the blue laser 202, and reflects the incident light from the red laser 203.

The objective lens 213 focuses the incident light from the blue laser 201 at the information recording layer (e.g., information recording layer 333 of FIG. 3) of the optical disc 150 and forms a light spot on the information recording layer The objective lens 213 focuses the incident light from the blue laser 202 at the information recording layer (e.g., information recording layer 337 of FIG. 3) of the optical disc 150 different from the information recording layer where the light of the blue laser 201 is focused, and forms a light spot. Furthermore, the incident light from the red laser 203 is focused at the guide layer of the optical disc 150 and a light spot is formed on the information recording layer.

Figure 8:
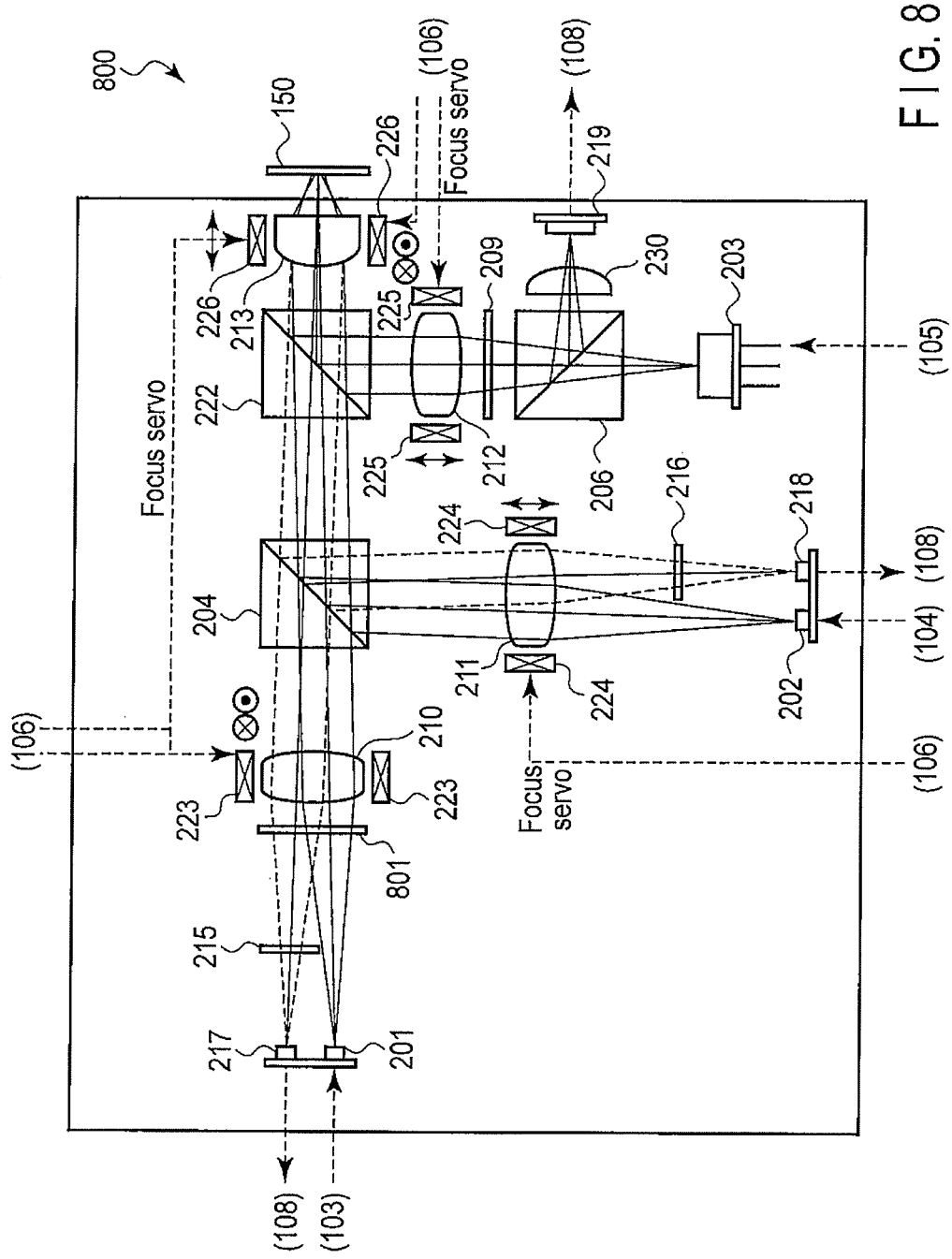
FIG. 8 is a view illustrating a pickup head unit according to a second embodiment.

As shown in FIG. 8, the blue laser 201 and the blue photo detector IC 217, the blue laser 202 and the blue photo detector IC 218 are placed on a plate. The light beam emerge from the blue laser 201 and the blue laser 202 enters the collimator lens 210, the collimator lens 211, and the objective lens 213 in a manner tilted from a direction parallel to the optical axis of the lens. The reflected light reflected from the optical disc 150 thus can be received by the blue photo detector IC without overlapping with the position of the blue laser.

The information recording process and the information reproducing process of the information recording/reproducing apparatus using the pickup head unit 800 according to the second embodiment are similar to when the number of the objective lens of the information recording/reproducing apparatus 100 according to the first embodiment is one. In other words, the information recording process and the information reproducing process shown in FIGS. 4 and 6 are to be carried out, and hence the description thereof will be omitted.

According to the second embodiment described above, the configuration of the pickup head unit can be reduced while maintaining the effects of the first embodiment, and hence it can be realized at lower cost while reducing the apparatus scale.

(Information Recording and Reproducing Method)

An information recording and reproducing method in the information recording/reproducing apparatus according to the first and second embodiments will now be described with reference to FIG. 9.

Figure 9:
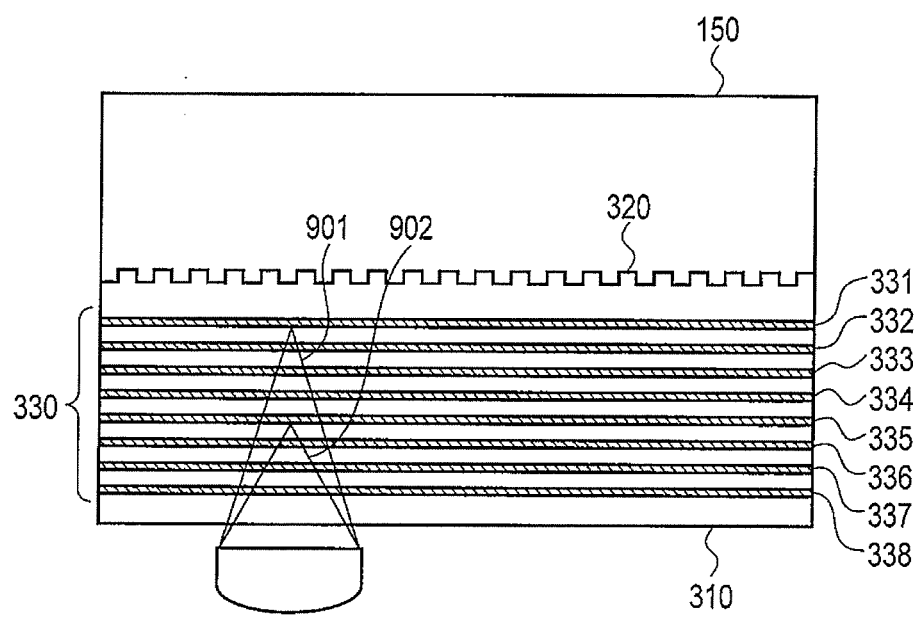
FIG. 9 is a view illustrating an information recording/reproducing method of the information recording/reproducing apparatus.

FIG. 9 shows a cross-section of the optical disc and an information recording order of each layer. A case where there are eight information recording layers (331 to 338) is assumed here.

The lights from the two light sources are passed through the objective lens and irradiated on the information recording layers (e.g., 331 and 335) different from each other. In this case, assume that the entire number of the information recording layers is 2N (N is a natural number), and the interval of the information recording layers at which the two beams are focused is N, and (N−1) layers exist between the information recording laysers. In other words, in the present embodiment, the two light beams, a light beam 901 and a light beam 902, are focused at the two layers spaced apart by four layers, which means three layers exist between the two layers, to form a light spot. The interval between the two lasers where the light spots are formed is maintained at "four" layers, and thus the four information recording layers of the eight are recorded or reproduced by each of the two lasers.

In other words, in the example of FIG. 9, the data items are simultaneously recorded or reproduced to or from the information recording layers 331 and 335, the information recording layers 332 and 336, the information recording layers 333 and 337, and the information recording layers 334 and 338 with two light beams. Therefore, the light beam 901 can carry out the recording and reproduction of the four layers distant from the objective lens, and the light beam 902 can carry out the recording and reproduction of the four layers close to the objective lens. The range of layers that need to be covered by each light beam can be reduce to four layers, which is half of eight layers, and thus the correction of aberration can be easier. In other words, if the distance between the adjacent information recording layers is 10 microns, and the distance from the surface 310 of the optical disc 150 to the information recording layer 338 is 40 microns, for example, the light beam 902 is responsible for 40 to 70 microns of the cover layer thickness, and the light beam 901 is responsible for 80 to 110 microns of the cover layer thickness. The cover layer thickness range is 30 microns for both light beams. If both light beams are configured to trace the adjacent information recording layer, for example, the cover layer thickness becomes 40 to 100 microns, and 50 to 110 microns, respectively, and thus the thickness range multiples to 60 microns for both light beams. As the difficulty in correcting the aberration is determined in accordance with the large and small of the thickness range, the configuration in which the thickness range is 30 microns is more preferable. Furthermore, the inter-layer cross talk can be reduced since the layer interval of the two light beams is large. Either one of the blue laser 201 or the blue laser 202 may carry out recording or reproduction of the data items on the four layers close to the objective lens.

In the above embodiments, two types of wavelengths of the light source to use for recording and reproduction, or red wavelength and blue wavelength, are used, but light sources of two arbitrary types of wavebands may be used.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pickup head, comprising:
    a plurality of light sources configured to irradiate light beams on an information recording medium comprising a plurality of information recording layers, the light sources including a first light source and a second light source, the information recording layers including a first recording layer and a second recording layer, the first recording layer and the second recording layer being in different positions in the information recording medium;
    a first objective lens configured to focus a first light beam from the first light source at the first recording layer to form a first light spot;
    a second objective lens configured to focus a second light beam from the second light source at the second recording layer to form a second light spot;
    a driving unit configured to move the first objective lens in a first direction and a second direction and to move the second objective lens in the first direction and the second direction, the first direction being parallel to the surfaces of the information recording layers and perpendicular to a data recording direction of a track of the information recording layers, the second direction being a stacking direction of the information recording layers;
    a first control unit configured to correct a displacement from target track along the first direction, the target track being irradiation target of a first light spot;
    a second control unit configured to control a position of the second light spot, the position being moved in the second direction; and
    one or more light receiving units configured to receive a first reflected light and a second reflected light, the first reflected light being a light beam that the first light beam is reflected by the first recording layer, the second reflected light being a light beam that the second light beam is reflected by the second information recording layer.

2. The head of claim 1, wherein if an address read out from a position irradiated by the first light spot is different from a desired address, the first control unit moves the position of the first light spot along the first direction so that the first light spot is positioned on a track to become the desired address.

3. An information recording method, comprising:
    dividing a target data item to generate a plurality of partial data items;
    irradiating the partial data items as light pulses on an information recording medium comprising a plurality of information recording layers using a plurality of light sources, the light sources including a first light source and a second light source, the information recording layers including a first recording layer and a second recording layer, the first recording layer and the second recording layer being in different positions in the information recording medium;
    focusing a first light beam from the first light source at the first recording layer using a first objective lens to form a first light spot;
    focusing a second light beam from the second light source at the second recording layer using a second objective lens to form a second light spot;
    moving the first objective lens in a first direction and a second direction and moving the second objective lens in the first direction and the second direction, the first direction being parallel to the surfaces of the information recording layers and perpendicular to a data recording direction of a track of the information recording layers, the second direction being a stacking direction of the information recording layers;

correcting a displacement from a target track along the first direction, the target track being an irradiation target of the first light spot; and controlling a position of the second light spot, the position being moved in the second direction, wherein a number of recording layers between the first recording layer and the second recording layer is one less than half of the total number of the information recording layers.

4. An information reproducing method, comprising:

irradiating light beams on an information recording medium comprising a plurality of information recording layers each recorded with partial data item using a plurality of light sources, the light sources including a first light source and a second light source, the information recording layers including a first recording layer and a second recording layer, the first recording layer and the second recording layer being in different positions in the information recording medium;

focusing a first light beam from the first light source at the first recording layer using a first objective lens to form a first light spot;

focusing a second light beam from the second light source at the second recording layer using a second objective lens to form a second light spot;

moving the first objective lens in a first direction and a second direction and moving the second objective lens in the first direction and the second direction, the first direction being parallel to the surfaces of the information recording layers and perpendicular to a data recording direction of a track of the information recording layers, the second direction being a stacking direction of the information recording layers;

correcting a displacement from a target track along the first direction, the target track being an irradiation target of the first light spot; and controlling a position of the second light spot, the position being moved in the second direction;

receiving a first reflected light and a second reflected light to extract a plurality of partial data items, the first reflected light being a light beam that the first light beam is reflected by the first recording layer, the second reflected light being a light beam that the second light beam is reflected by the second information recording layer; and reproducing a reproducing target data item by combining the partial data items, wherein a number of recording layers between the first recording layer and the second recording layer is one less than half of the total number of the information recording layers.

5. The head of claim 1, wherein the first control unit comprises a collimator lens and a collimator lens actuator.

6. The head of claim 1, wherein the second control unit comprises a collimator lens and a collimator lens actuator.

7. The head of claim 1, wherein the first control unit comprises a first collimator lens and a first collimator lens actuator and the second control unit comprises a second collimator lens and a second collimator lens actuator.

8. The head of claim 1, wherein the one or more light receiving units comprises at least two light receiving units to receive the first reflected light and the second reflected light.

* * * * *